May 17, 1966  D. L. DOWNS ET AL  3,251,322
MATERIALS HANDLING PALLET
Filed Nov. 10, 1964
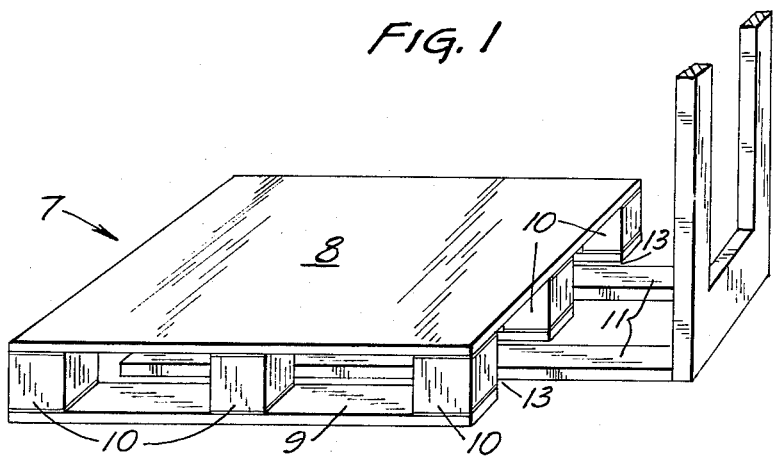
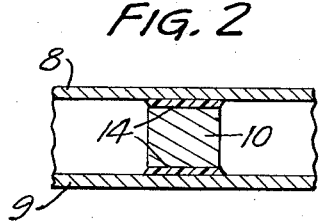
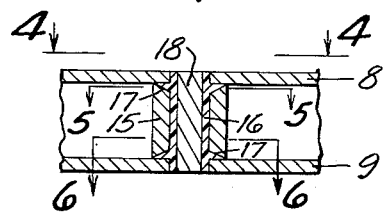
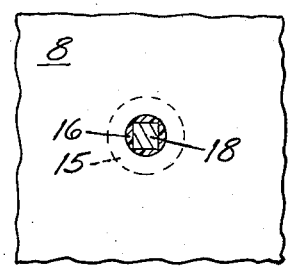
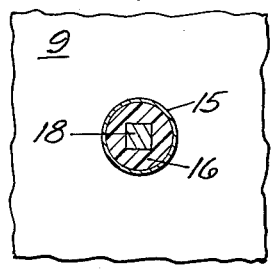
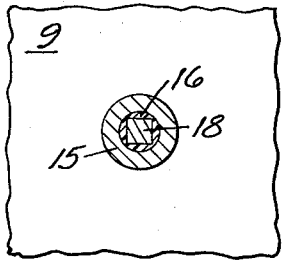
INVENTORS
DAN LLOYD DOWNS
GEORGE C. HARRISON
BY Carpenter, Abbott, Coulter & Kinney
ATTORNEYS 3,251,322
MATERIALS HANDLING PALLET
Dan L. Downs, St. Paul, and George C. Harrison, Roseville, Minn., assignors to Minnesota Mining and Manufacturing Company
Filed Nov. 10, 1964, Ser. No. 410,102
8 Claims. (Cl. 108—58)

This invention relates to an improvement in pallets such as adapted for the mechanical handling of materials in warehouses, etc.

Pallets are understandably subjected to extreme abuse. They are shuttled back and forth between the numerous points requiring delivery of materials and each delivery can involve numerous handlings by such mechanical means as fork trucks. The concern of the operators of such mechanical means is not for the care of the pallets and accordingly the pallets are repeatedly dropped, jarred and otherwise mishandled.

Obviously, one of the requirements for the construction of a pallet is durability. However, the weight of the pallet contributes to the shipping expense of the goods and consequently the more durable but heavier metal materials are impractical for pallet construction. Wood is not nearly as durable as metal materials, however, it is much lighter in weight, and the cost of constructing a pallet out of wood is much lower. Therefore, wood has in general been accepted as the compromising material for use in constructing pallets.

Wooden pallets are conventionally made out of two basic parts, i.e., a materials loading platform and a support means. The support means elevates the platform so that the tines of a fork truck can go under the platform which then allows the fork truck to lift and move the pallet and materials loaded thereon. These basic parts must be securely fastened together to withstand the severe physical abuse attendant to mechanical handling and heretofore mechanical fasteners such as nails, screws, etc. were the only known practical fastener means available.

The use of mechanical fasteners such as nails is unsatisfactory for several reasons. Nailing frequently causes splitting of the wood which of course weakens the holding power. Even if the nailing is done successfully, splitting may still occur due to the concentrated holding power of the nails and the stresses that are set up in the wooden components as their moisture content changes. Furthermore, in that pallets are normally subjected to rough usage, the mechanical fasteners work loose to provide sharp edges that tear and otherwise damage goods carried on the pallets. Also the mechanically fastened pallets become misshapened after a short period of normal usage which causes serious problems where loading of trucks, etc. requires that the pallets fit into designated spacings.

While adhesive bonds are sometimes used in place of mechanical fasteners, they have heretofore been considered unsatisfactory where physical shock is involved such as is encountered in pallet handling. The fragility of normal adhesive bonds joining wood elements together is quite apparent from an observation of furniture pieces which have the wooden components thereof adhesively joined; after such pieces have been subjected to even relatively minor abuse, as compared to that of the pallets, they ordinarily become wobbly and unsteady.

It was therefore quite surprising to find that pallet constructions could be improved by eliminating the need for mechanical fasteners in their construction. However, this has been found to indeed be the case when the support means and loading platform are adhesively simultaneously joined to and separated from one another by a thick, e.g. $\frac{1}{100}''$ to $\frac{1}{2}''$, layer of a tough, shear resistant, resilient wood-bonding elastomer. (The thickness of the layer is determined from the properties of the elastomer chosen and from the shock and resilience that can be expected in the particular service designated for the pallet.) Pallets made in this manner absorb shocks, twists and other deforming and weakening stresses better and with much less damage than mechanically fastened pallets. Accordingly the usable life of the pallets is substantially increased. Furthermore, upon removal of the deforming stresses, the pallets return to their original shape by reason of the resiliency of the elastomer. Thus splintering is reduced, and as mechanical fasteners are not used, snagging and tearing of the loaded materials is almost eliminated.

Additional advantages are realized in that the use of elastomer provides for much faster and easier assembly of the pallet components. Also assembly of the pallets can be accomplished while the wood is dry. Where nails are used, it is well known that green or wet wood is essential to prevent splitting. Wet wood is substantially heavier than dry wood and therefore there is an additional savings in shipping expense.

Further advantages will become apparent by reference to the following detailed description and drawings in which:

FIGURE 1 is a perspective view of a pallet incorporating the present invention as it is being engaged by a fork truck.

FIGURE 2 is an enlarged sectional view showing one member of the support means fastened to the loading platform by means of the present invention.

FIGURE 3 is a view similar to FIGURE 2 showing an alternative embodiment of the invention.

FIGURE 4 is a view taken on section lines 4—4 of FIGURE 3.

FIGURE 5 is a view taken on section lines 5—5 of FIGURE 3.

FIGURE 6 is a view taken on section lines 6—6 of FIGURE 3.

Referring to FIGURES 1 and 2, a pallet 7 has a materials loading platform 8 supported in an elevated position by brace members 9 and spacers 10. Said spacers are arranged to provide openings 13 for insertion of the tines 11 of a fork truck 12 under the platform. The pallet and materials thereon can thus be easily handled by the fork truck operator without the necessity of manual assistance in loading and unloading.

The brace members 9 are joined to the spacers 10, and the spacers 10 are joined to the platform 8 through the medium of a thick layer of bonding substance that cures to form a highly shock absorbent, tough but yieldable, resilient (resists compression set) elastomeric cushion 14 between the adjacent interfaces thereof. An extremely suitable bonding substance for this use has been found to be a polyalkylene ether glycol based amine modified crosslinked polyurethane elastomer or rubber, which cures from its liquid to a solid state at normal room temperatures. During curing this synthetic rubber apparently chemically bonds to the wood of the pallet to provide a permanent flexible water-proof bond of great tenacity, usually being stronger than the wood.

These rubbers are formed by combining two compatible components liquids with one another, one of the component liquids containing part of the reactants and the other component containing the remainder of the reactants to form the rubber. Upon combining the liquids, an initially liquid, homogeneous, readily spreadable mass is formed which quickly forms a moldable gel. In this spreadable and/or moldable state the material, unlike an ordinary adhesive, can be applied in reasonably thick layers in which condition it solidifies to a tough, adherent shock absorbing rubber cushion separating the pallet parts while at the same time securely bonds the parts together. Applied as the principal fastening means between the platform and supporting components, the thick rubber joint effectively dampens the various impact forces that the pallet normally receives when handled by mechanical equipment.

There are a number of these polyurethane rubbers that are useful, all of which are initially liquid solvent-free 100% solids system which in the presence of certain metallic catalyst compositions, e.g. dibutyltin oxide cure to a solid, cross-linked elastomer at room temperature or at slightly elevated temperatures. A preferred formulation of one such rubber is given herebelow:

ELASTOMER FORMULATION

*1st liquid component*

| Ingredient: | Parts by weight |
|---|---|
| Polypropylene glycol (about 2000 molecular weight) | 352 |
| Methylene bis ortho-chloro analine | 16 |
| Catalyst (usually an organo-metallic compound or metal organic salt or mixture thereof) | 3.6 |
| Fillers, preservatives and other additives | 24.0 |
| | 395.6 |

*2nd liquid component*

| Ingredient: | Parts by weight |
|---|---|
| Toluene diisocyanate | 62.3 |
| Polypropylene glycol (about 400 molecular weight) | 31.4 |
| Trimethylol propane | 2.0 |
| | 95.7 |

The two components are mixed in a ratio to provide approximately one reactive NCO group for each reactive hydrogen, i.e., amine or hydroxyl group. Immediately after mixing, the still flowable elastomer is smeared onto the parts to be joined in a thick blob and the parts lightly pressed together. Then the pallet with the parts so joined is set aside until the elastomeric joints thereof solidify. The resulting elastomeric joints have durometers (Shore $A_2$) of from about 30 to 80 generally.

Referring to an alternative embodiment of the invention shown in FIGURES 3–6, spacers 15 are abutted against the adjacent faces of the platform 8 and brace members 9. An aperture 16 extends through the platform, spacers and support plate, and dish shaped cavities 17 are provided at the interfaces surrounding the aperture at each end of the spacers. A rigid peg 18 having a cross-section substantially less than the aperture is centrally positioned in the aperture. The spacing between the peg and the wall of the aperture and including the cavities, is filled with an elastomer such as described above. The elastomer thus forms a secure bond between the parts and in particular due to the mentioned cavities. The cavities provide the spacing within which the elastomer is able to set up a bond between the interfaces of the parts. The tubular elastomer cushion between the aperture wall and the rigid peg allows twisting of the parts whereas the rigidity of the peg prevents unduly stretching of the elastomer in an axial direction which would allow undesirable separation of the parts.

It will be understood that the above are merely preferred examples of devices incorporating the present invention and various modifications may be made without departing from the scope of the invention.

What is claimed is:

1. A twist and shock resistant pallet comprising a materials loading platform and supporting means maintaining said platform in an elevated position, said platform and supporting means having mating wooden parts at their juncture to one another, means joining said platform and supporting parts to and spacing them from one another which principally comprises a layer of substantial thickness of a tough, shock absorbant, resilient elastomeric cushioning material, strongly adhering to said wooden parts and maintaining said parts in spaced relation to one another.

2. A twist and shock resistant pallet as defined in claim 1 wherein the said joining means comprises a tough, shock-absorbent, cross-linked elastomer strongly adherent to wood and comprising amine modified polyalkaline ether glycol based polyurethane reaction product of a liquid reaction mixture solidified in the presence of a low temperature curing catalyst.

3. A pallet comprising a materials loading platform, supporting means including spacers for maintaining said platform in an elevated position, combination cushion and fastening means between one end of the spacers and the platform which principally comprises a thick layer of resilient rubbery bonding material that securely joins said supporting means and platform together and absorbs stresses tending to deform the pallet during normal use.

4. A pallet as defined in claim 2 wherein the supporting means also includes brace members joined to the free end of the spacers, said joints comprising the same combination cushion and fastening means as between the spacers and platform.

5. A pallet comprising a materials loading platform and support means for maintaining said platform in an elevated position, said support means including a spacing block having one end abutting the bottom side of said platform, an aperture extending through said platform and into said block, the interface between said abutting end and platform having a dish-shaped cavity surrounding the aperture, a rigid peg having a cross-section substantially smaller than said aperture centrally positioned within said aperture and at least spanning the cavity at said interface, and a resilient bonding material within said cavity and the space between the peg and the wall of the aperture providing the principal fastening means between the platform and support means.

6. A pallet comprising a materials loading platform and support means for maintaining said platform in an elevated position, said support means including a spacing block having one end abutting the bottom side of said platform, an aperture extending through said platform and into said block, a rigid peg having a cross-section substantially smaller than said aperture centrally positioned within said aperture and extending across the juncture between the block and the platform, and a resilient bonding material in the space between the peg and the wall of the aperture providing the principal fastening means between the platform and support means.

7. A pallet as defined in claim 6 wherein the said joining means comprises a tough, shock-absorbent, cross-linked elastomer strongly adherent to wood and comprising amine modified polyalkaline ether glycol based polyurethane reaction product of a liquid reaction mixture solidified in the presence of a low temperature curing catalyst.

8. A pallet comprising a materials-loading platform and supporting means maintaining said platform in an elevated position, said platform and supporting means principally connected together by a substantially thick layer of tough, shock-absorbent, resilient and flexible elastomeric cushioning material strongly adhering to said platform and supporting means, said elastomeric connection dampening the impact forces received by the pallet in normal usage.

References Cited by the Examiner

UNITED STATES PATENTS

| | | | |
|---|---|---|---|
| 2,493,562 | 1/1950 | Yarman | 108—58 |
| 2,673,052 | 3/1954 | Risch. | |
| 2,725,087 | 11/1955 | Potter | 108—55 X |
| 2,738,153 | 3/1956 | Frase | 108—58 |
| 2,762,593 | 9/1956 | Weiss | 108—57 |
| 2,770,434 | 11/1956 | McNally. | |
| 2,955,791 | 10/1960 | George | 108—56 |
| 3,055,624 | 9/1962 | Wilson | 108—58 |
| 3,079,876 | 3/1963 | Doane | 108—56 |

FRANK B. SHERRY, *Primary Examiner.*

G. O. FINCH, *Assistant Examiner.*